United States Patent [19]
Imai

[11] Patent Number: 6,067,128
[45] Date of Patent: May 23, 2000

[54] LIQUID-CRYSTAL DISPLAY PROJECTOR INCLUDING AN OPTICAL PATH ADJUSTER ARRANGED IN THE LIGHT PATH FROM THE LIGHT SOURCE TO THE LIQUID-CRYSTAL DISPLAY ELEMENT

[75] Inventor: Masao Imai, Tokyo, Japan

[73] Assignee: NEC Corporation, Tokyo, Japan

[21] Appl. No.: 08/616,346

[22] Filed: Mar. 15, 1996

[30] Foreign Application Priority Data

Mar. 16, 1995 [JP] Japan .................................. 7-057368

[51] Int. Cl.⁷ ............................. G02F 1/1335; G02F 1/00
[52] U.S. Cl. ................................. 349/8; 348/751; 353/34
[58] Field of Search ........................... 349/8, 9; 359/634, 359/637; 353/34; 348/750, 757, 756

[56] References Cited

U.S. PATENT DOCUMENTS

| | | | |
|---|---|---|---|
| 4,864,390 | 9/1989 | McKechnie et al. | 349/8 |
| 5,515,202 | 5/1996 | Wright | 359/634 |

FOREIGN PATENT DOCUMENTS

| | | |
|---|---|---|
| 61-99118 | 5/1986 | Japan . |
| 1-94985 | 6/1989 | Japan . |
| 3-72332 | 3/1991 | Japan . |
| 3-84536 | 4/1991 | Japan . |
| 4-204591 | 7/1992 | Japan . |
| 5-273515 | 10/1993 | Japan . |

OTHER PUBLICATIONS

S. Morozumi et al., "LCD Full–Color Video Projector", *Society for Information Display (SID) 86 Digest*, vol. XVII, 1986, pp. 375–378.

S. Aruga et al., "High–Resolution Full–Color Video Projector with Poly–Si TFT Array Light Valves", *SID 87 Digest*, vol. XVIII, May 12–14, 1987, pp. 75–78.

A.H.J. van den Brandt et al., "New Plusfactors n an LCD–Projector", Conference Record of the 1991 International Display Research Conference, Oct. 15–17, 1991, pp. 151–154.

*Primary Examiner*—William L. Sikes
*Assistant Examiner*—Kenneth Parker
*Attorney, Agent, or Firm*—Sughrue, Mion, Zinn, Macpeak & Seas, PLLC

[57] ABSTRACT

In an LCD projector, a color mixing optical system for mixing color beams transmitted through LCD elements includes an optical path length adjuster in three light paths from a light source to the LCD elements. The adjuster includes polarization beam splitters, phase plates, and light-beam reflectors. The numbers of reflections of the color beams in the optical paths from the light source to the projection lens are set only to odd values or only to even values. The adjusters are arranged and configured to equalize the respective optical path lengths to each other. With this configuration, the relative distribution of intensity of illumination is substantially equalized for the beams illuminating the respective LCD elements. Compounding the beams, there is attained a projected screen image with a satisfactory white balance and homogeneous chromaticity and luminance. Consequently, there is implemented an LCD projector capable of projecting on a screen an image having a favorable white balance and uniform chromaticity and luminance.

10 Claims, 12 Drawing Sheets

LIQUID-CRYSTAL DISPLAY PROJECTOR INCLUDING AN OPTICAL PATH ADJUSTER ARRANGED IN THE LIGHT PATH FROM THE LIGHT SOURCE TO THE LIQUID-CRYSTAL DISPLAY ELEMENT

BACKGROUND OF THE INVENTION

The present invention relates to a liquid-crystal display (LCD) projector for projecting on a screen an enlarged image of an image produced by LCD elements, and in particular, to an LCD projector capable of displaying the image in colors, the display including three sheets of LCD elements, a color separating optical system including dichroic mirrors, and a color mixing optical system including a cross dichroic mirror and/or a cross dichroic prism.

DESCRIPTION OF THE RELATED

A conventional LCD projector will now be described by referring to accompanying drawings. The LCD projector for projecting an enlarged color image on a screen includes at least a light source, a color separating optical system for separating white light from the light source by dichroic mirrors and the like into three beams of red, green, and blue; three sheets of LCD elements respectively for red, green, and blue; a color mixing optical system including a dichroic mirror and the like to mix red, green, and blue images into a display image, and a projection lens. For the color separating and mixing operations, there have been commonly known two methods, respectively.

The color separation will be conducted in a mirror sequential method or in a method using cross dichroic mirrors (or prisms). In the former, two kinds of dichroic mirrors and prisms are disposed to form an angle of 45° between the dichroic planes and the optical axes respectively associated therewith such that the sets respectively of the dichroic mirrors and prisms are arranged in parallel with each other so as to sequentially conducting the color separation and color mixing operation for each color at a time. In the latter, two kinds of dichroic mirrors and prisms are disposed such that the dichroic planes thereof are orthogonal to each other to achieve the color separation and color mixing operation for three colors at a time. In this method, when cross dichroic mirrors and prisms are employed in the color mixing optical system, the following advantage is attained when compared with the case in which the color mixing operation is effected in the mirror sequential method. Namely, it is possible to reduce the distance between the LCD elements and the projection lens and hence the back focal length of the projection lens can be minimized.

In this regard, an LCD projector using cross dichroic prisms in its color mixing optical system has been described, for example, in "High-Resolution Full-Color Video Projector with Poly-Si TFT Array Light Valves" written in pages 75 to 78 of the "Society for Information Display (SID) International Symposium Digest of Technical Papers." FIG. 1 is a plan view showing an example of the conventional projection LCD described in the literature. In this display shown in FIG. 1, light emitted from a light source 51 is collected by a parabolic mirror 52 and then an attained beam of light is separated via two dichroic mirrors 53 and 54 into light beams respectively of three primary colors. A portion of the beam is reflected by a mirror 55. Resultantly, the respective beams illuminate a red LCD element 58, a green LCD element 59, and a blue LCD element 60. Images respectively displayed on these elements 58 to 60 are synthesized by a cross dichroic prism 56 into an image, which is enlarged and projected by a projection lens 57 onto a screen, not shown.

Moreover, an LCD projector adopting cross dichroic prisms in its color mixing optical system and cross dichroic mirrors in its color separating optical system has been described, for example, in "LCD Full-Color Video Projector" written in pages 375 to 378 of the "SID International Symposium Digest of Technical Papers." FIG. 2 is a plan view showing an example of the conventional LCD projector described in the above literature. In the conventional display of FIG. 2, light emitted from a light source 51 is collected by a parabolic mirror 52 and then is separated by a cross dichroic mirror 61 into light beams respectively of three primaries. A portion of the beam is reflected by a mirror 55. The resultant beams illuminate a red LCD element 58, a green LCD element 59, and a blue LCD element 60. Images presented on the LCD elements 58 to 60 are synthesized by a cross dichroic prism 56 into an image. The imae is then magnified and projected through a projection lens 57 onto a screen, not shown. Incidentally, using cross dichroic mirrors in the color mixing optical system, there can be configured an LCD projector conducting the same or similar functions.

In the projection displays of the prior art described above, the distance between each of the LCD elements 58 to 60 and the projection lens 57 is minimized and hence the back focal length of the projection lens can be reduced. When the back focal length is minimized, it is possible to advantageously manufacture at a low cost a projection lens which produces a focused image with reduced distortion and aberration while reducing the loss of light passing therethrough.

Subsequently, description will be given of conventional examples related in the technical field to the present invention. In the Japanese Patent Laid-Open Publication No. 4-204591, it has been described that the length of an optical path is corrected by a polarized-light beam splitter and a quarter-wave plate although there are missing the cross dichroic mirror and prism in the color mixing optical system.

FIG. 3 shows in a plan view the technology described in conjunction with the conventional example above. In the configuration of FIG. 3, light radiated from a light source 51 is collected by a parabolic mirror 52 to be incident to a polarization beam splitter 62. A beam of p-polarized light obtained from the beam splitter 62 is emitted onto a dichroic mirror 65 such that only a beam of red light thereof is reflected by the mirror 65. The reflected light beam illuminates a red LCD element 58. An image created on the LCD element 58 is enlarged and projected by a red projection lens 66 onto a screen, not shown.

On the other hand, a beam of s-polarized light reflected by the beam splitter 62 is transmitted to a dichroic mirror 63 through which only a beam of blue light is allowed to pass and by which beams of green and red light are reflected. Of the green and red light beams, only the green light beam is reflected by a dichroic mirror 64. The reflected green light beam then illuminate a green LCD element 59. An image generated on the LCD element 59 is magnified and projected by a green projection lens 67 onto the screen.

The blue light beam from the dichroic mirror 63 passes a quarter-wave plate 69 to be reflected by a mirror 70 and then the reflected beam passes again the quarter-wave plate 69. In this process, the direction of polarization is rotated 90° and hence the s-polarized light is transformed into a p-polarized light. The beam of p-polarized blue light then passes the beam splitter 62 to illuminate a blue LCD element 60. An image presented on the LCD element 60 is enlarge and projected by a blue projection lens 68 onto the screen. By adjusting the positions of the respective constituent optical elements, it is possible to equalize to each other the distances from the light source 51 to the LCD elements 58 to 60 of the respective colors.

Additionally, according to the Japanese Patent Laid-Open Publication No. 61-99118, the distances of light paths from the light source to the LCD elements of the respective colors are equalized to each other by cross dichroic mirrors in the color separating and compounding optical systems. This is achieved by configuring the color separating and mixing optical systems in a two-layer structure like in a two-story house.

In the Japanese Patent Laid-Open Publication No. 3-84536, there has been described a technology to equalize the relative intensity of illumination on each of the LCD elements. Namely, a filter is disposed in the light path of each color to correct the distribution of intensity of illumination.

According to the Japanese Patent Laid-Open Publication No. 3-72332, a correcting optical element including a concave lens and a convex lens is provided in the light path of each color to correct the distribution of intensity of illumination.

Described in the Japanese Utility Model Publication No. 1-94985 is a technology to correct the light path lengths in which an optically transparent substance is arranged in an optical path having a long distance to reduce the optical path length according to the difference in the refractive index.

In the Japanese Patent Laid-Open Publication No. 5-273515, there has been described a projection-type LCD. Although there are missing the cross dichroic mirrors and prisms in the color mixing optical system, in order to correct the length of a light path from a light source to each of the LCD elements of the respective colors, a mirror is disposed in the light path of each color.

However, in the conventional LCD projector including cross dichroic mirrors and prisms in the color compounding system as described in the above literature, the light path length between the light source to each LCD element varies depending on colors. The light beam attained by collecting light from the light source by the parabolic mirror includes diverging and converging components. In consequence, the difference in the optical path length results in the discrepancy in the relative distribution of intensity of illumination between the light beams illuminating the respective LCD elements. This therefore leads to deterioration in the white balance of the projected image created by mixing the images respectively attained from the LCD elements. Moreover, there arises a problem of nonuniformity in the chromaticity and distribution of luminance.

In the Japanese Patent Laid-Open Publication No. 4-204591, there are employed three projection lenses and hence the projection angle of the beam onto the screen varies between red, green, and blue. This causes the color shading in which the color of the image produced on the screen changes depending on the position of the viewer of the image. Furthermore, the numbers of reflections respectively of the light beams by the optical constituent components arranged respectively between the light source 51 and the LCD elements 58 to 60 of red, green, and blue are one, three, and two, respectively. Namely, the reflection numbers are set to odd and even values at the same time. If such reflections take place as above, the distribution of intensity of illumination is inverted in the horizontal direction (orthogonal to the optical axis) as indicated by the light path of each color in FIG. 3. With this inversion, the relative distribution of intensity of illumination of each color cannot be completely equalized, resulting in the color shading. Additionally, even with a slight positional shift of the light source 51, the peak position of the distribution of intensity of illumination is moved in the opposite direction, which leads to a problem that the color shading is emphasized.

According to the Japanese Patent Laid-Open Publication No. 61-99118, the volume of the LCD projector is disadvantageously increased. In the Japanese Patent Laid-Open Publication No. 3-84536, the distribution of intensity of illumination is adjusted by the filters. This however leads to a loss of the quantity of light effectively used and hence there is produced a dark image. According to the Japanese Patent Laid-Open Publication No. 3-72332, the manufacturing of the correction optical element is attended with difficulty and there is required a high production cost. In addition, when mass-producing LCD projectors above, it is difficult to completely correct the color shading while lowering the characteristic deviation between parts and the errors in the assembling of the parts. In the Japanese Utility Model Publication No. 1-94985, the correction of the light path length is effective in a length of about ⅓ the length of the optically transparent substance. This means that the correction length is limited. According to the Japanese Patent Laid-Open Publication No. 5-273515, the size of the obtained display is considerably increased.

Description has been briefly given of the problems associated with the conventional examples of LCD projectors. Moreover, there can be considered a method in which a relay lens is provided in the light path of each color to thereby correct the distribution of intensity of illumination for the pertinent LCD element. This however cannot completely correct the distribution. Furthermore, the method in which the beam of light from the optical source is fully diverged to obtain a uniform intensity of illumination is attended with a large loss in the quantity of effective light and hence is unpractical.

SUMMARY OF THE INVENTION

It is therefore an object of the present invention to provide an LCD projector capable of obtaining a satisfactory white balance and uniform chromaticy and intensity of illumination in the projected screen image.

In accordance with the present invention, there is provided an LCD projector capable of displaying a color image.

The LCD projector includes a light source, a color separation optical system for separating light from the light source into three color beams respectively of red, green, and blue; three liquid-crystal display (LCD) elements arranged for the color beams, respectively; a color mixing optical system including a cross dichroic mirror or prism for mixing color beams transmitted through the LCD elements into one beam, a projection lens, and optical path length adjusting means disposed in at least one of the optical paths from the light source respectively to the three LCD elements. The optical path length adjusting means includes a polarization beam splitter, a phase plate, and a beam reflection element and is arranged and constructed such that the numbers of reflections of the color beams reflected in the respective optical paths from the light source to the projection lens are set only to odd numbers or only to even numbers.

In the optical path length adjusting means, the phase plate and the beam reflection element including two reflection surfaces orthogonal to each other are sequentially arranged in a direction in which a light reflected by the beam splitter propagates. The reflection element is arranged such that a light reflected by the reflection element passes the phase plate and the beam splitter to illuminate the LCD element associated therewith. Moreover, the optical path length adjusting means includes a first phase plate and a first reflection element. The plate and the element are sequentially arranged in a direction in which a light reflected by the beam splitter propagates. The first reflection element is arranged such that a light reflected by the first reflection element passes the first phase difference plate and the beam splitter. The optical path length adjusting means includes a second phase plate and a second reflection element. The plate and the element are sequentially arranged in a direction in which the light passes the beam splitter. The second reflection element is arranged such that a light reflected by the second reflection element passes the second phase difference plate and is then reflected by the beam splitter to illuminate the associated LCD element.

Consequently, in accordance with the LCD projector of the present invention, means for adjusting optical path length including a polarized-light beam splitter, a phase plate, and a light-beam reflection element is arranged in at least one of the light paths from the light source to three LCD elements to set the numbers of reflections for the light beams respectively of three colors only to odd values or only to even values. Moreover, the means is so disposed to substantially equalize the respective light path lengths to each other. In consequence, in the LCD projector including cross dichroic mirrors and prisms in the color mixing optical system, even when the light beam radiated from the light source contains diverging and conversing components, there is obtained substantially the same relative distribution of intensity of illumination for the light beams incident to the respective LCD elements.

BRIEF DESCRIPTION OF THE DRAWINGS

The objects and features of the present invention will become more apparent from the consideration of the following detailed description taken in conjunction with the accompanying drawings in which.

DESCRIPTION OF THE PREFERRED EMBODIMENTS

Figure 4:
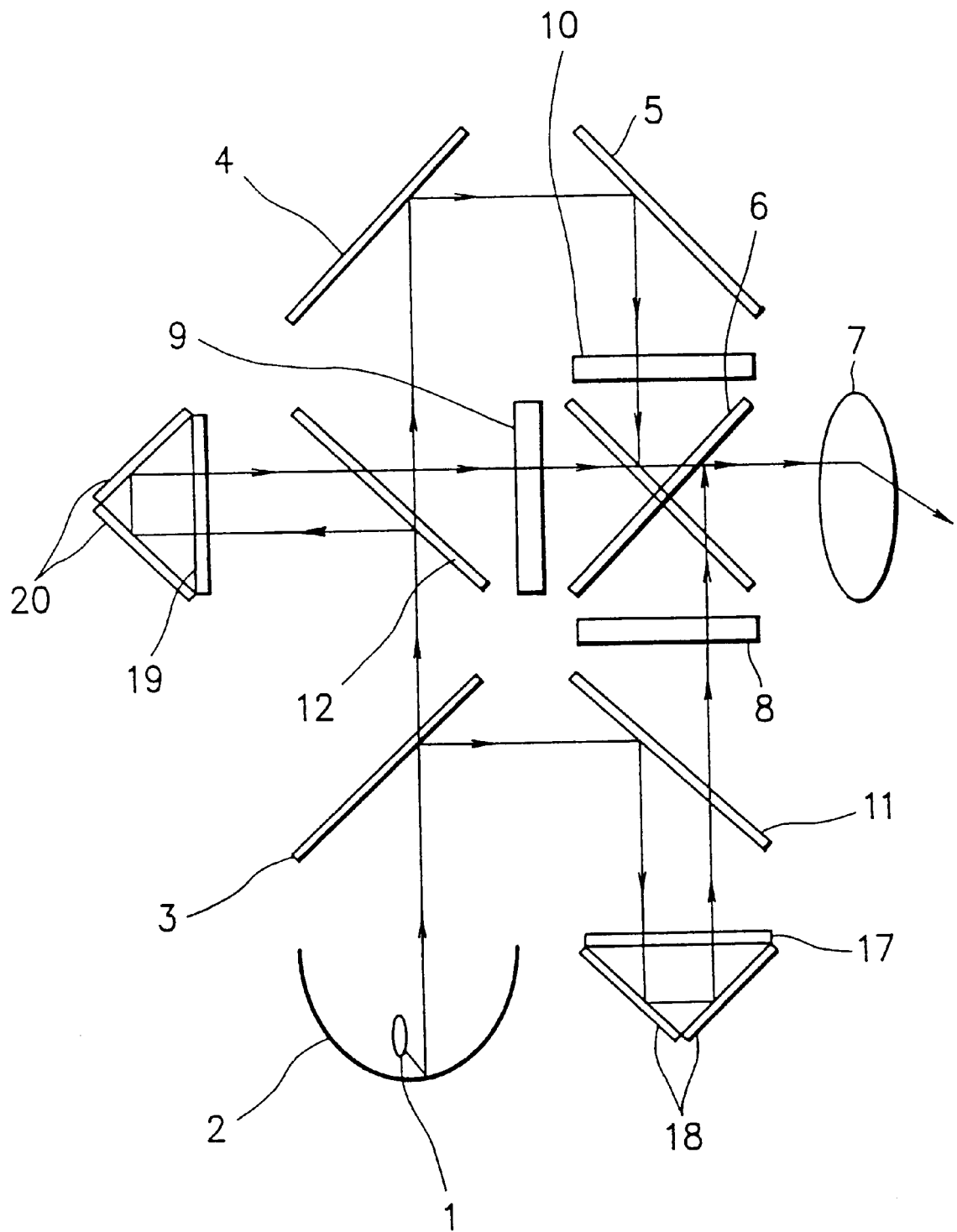
FIG. 4 is a plan view schematically showing the configuration of a first embodiment of the LCD projector in accordance with the present invention.
Figure 5A:
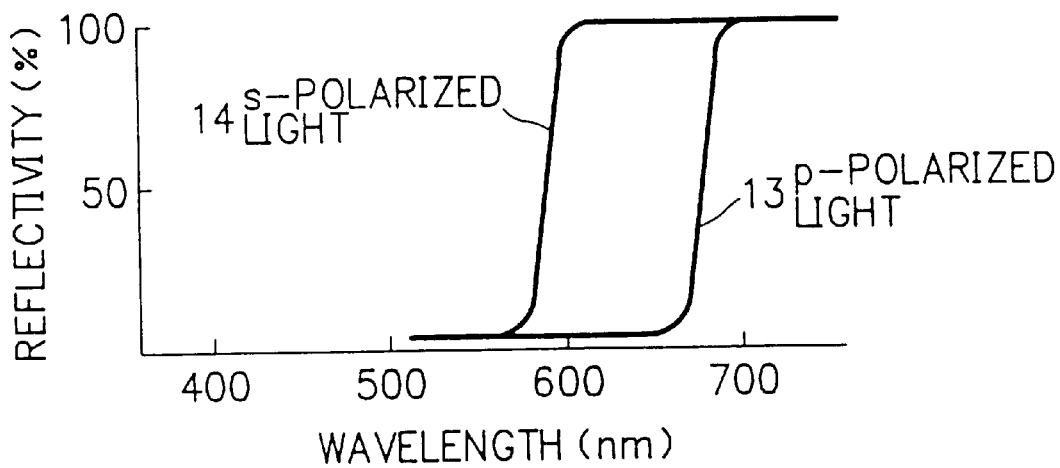
FIGS. 5A and 5B are graphs showing polarized-light reflection characteristics of polarization beam splitters used in the first embodiment.
Figure 5B:
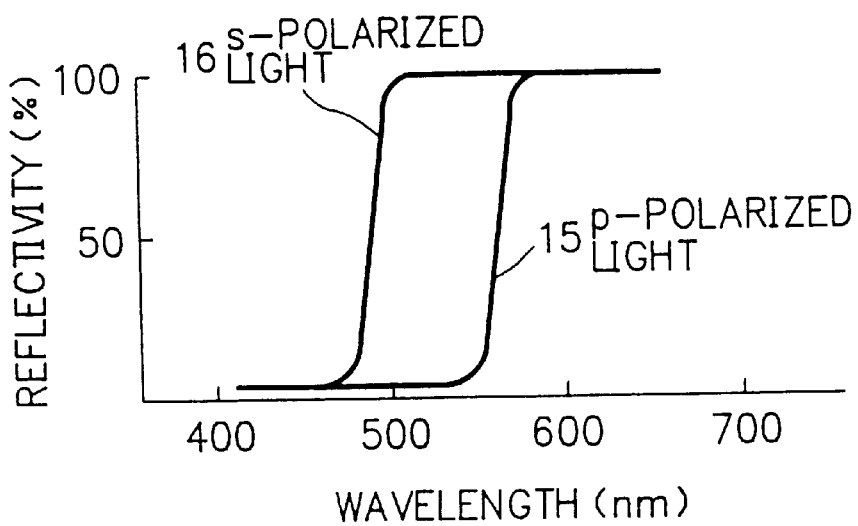

Referring now to the accompanying drawings, description will be given in detail of embodiments of the LCD projector in accordance with the present invention. FIGS. 4, 5A, and 5B, as well as FIGS. 6 to 12 show the embodiments of the LCD projector of the present invention.

FIG. 4 shows in a plan view a first embodiment of the LCD projector in accordance with the present invention. The display of FIG. 4 includes a light source 1, a parabolic mirror 2, dichroic mirrors 3 and 4, a mirror 5, a cross dichroic mirrors 6, a projection lens 7, a red LCD element 8, a green LCD element 9, a blue LCD element 10, polarization beam splitters 11 and 12, phase plates 17 and 19, and light-beam reflection elements 18 and 20. This configuration includes optical constituent components in the form of a plate by way of example. Each component will now be specifically described.

The light source 1 includes a 250-watt metal halide lamp. The lamp is of the clear type, namely, the frost process is not conducted on the surface of the bulb thereof. The lamp is fixedly attached onto a surface of the parabolic mirror 2 such that the center position of the light emitting section thereof is shifted from the position of the focal point of the parabolic mirror 2 toward the LCD elements 8 to 10. The parabolic mirror 2 includes a glass substrate. A surface thereof on the side of the light source 1 is mirror-finished to form a cold mirror by evaporating a layer of a dielectric substance to remove infrared components of light from the light source 1, thereby preventing such components from reaching the LCD elements 8 to 10 of the respective colors. The focal distance of the parabolic mirror 2 is 13 millimeters (mm) and the opening from which the light beam is emitted has a diameter of 100 mm.

The dichroic mirrors 3 and 4 are configured as follows. A dichroic layer including a multiplicity of layers of a dielectric material is evaporated on a first primary surface of a glass substrate and an anti-reflection film including a multilayer film of a dielectric material is evaporated on a second primary surface thereof. The dichroic mirror 3 has a characteristic to reflect a red light beam and transmits the green and blue light beams therethrough. The dichroic mirror 4 has a property to reflect a blue light beam and allows the green light beam to pass therethrough. The dichroic mirror 5 is produced by evaporating aluminum on a glass substrate, and particularly, a reflection enhancing layer is formed on the surface.

The cross dichroic mirror 6 is constructed such that two kinds of dichroic mirrors are orthogonal to each other therein. Each mirror includes a glass substrate and a dichroic film of a multilayer film of a dielectric material on one primary surface thereof and an anti-reflection film of a multiple layers of a dielectric material on the other one primary surface, these films being formed by vapor deposition.

One of the dichroic mirrors has a characteristic to reflect the red light beam and transmits the blue and green light beams therethrough, whereas the other one thereof has a property to reflect the blue light beam and allows the green and red light beams to pass therethrough. The cross dichroic mirror 6 is arranged such that the light beams transmitted via the respective LCD elements 8 to 10 are compounded into a beam, which is sent to the projection lens 7.

The projection lens 7 enlarges the image obtained by combining the light beams respectively from the LCD elements 8 to 10 to project the enlarged image on the screen. The lens 7 includes a focus adjusting mechanism to produce the projected image on focus and a zooming mechanism to alter the size of the screen image without changing the projection distance thereof.

Each of the LCD elements 8 to 10 includes two glass substrates each having a transparent electrode layer. The space between the substrates is filled with liquid crystal. Thereafter, a polarizer and an analyzer are attached thereonto. Although not shown, the voltage applied to each of the LCD elements 8 to 10 is controlled for each pixel according to video signals from a video signal processing circuit and a liquid crystal driving circuit. A twisted nematic (TN) liquid crystal is employed in this system. The state of liquid crystal is changed by the applied voltage of each pixel as follows. The state of polarization is altered in the light radiated onto the LCD element. Using the polarizer and analyzer, an intensity modulation is applied to the illumination light according to the image. The axis of transmission of the polarizer is set to propagate therethrough a p-polarized light, which will be described later. To drive liquid crystal, there is adopted the active matrix method in which a thin-film transistor is configured as a switching element for each pixel. The display area has a 76 mm diagonal. Each of the LCD elements 8 to 10 includes a fine adjustment mechanism, not shown. The mechanisms are so adjusted to equalize to each other the light path lengths from the projection lens 7 to the respective LCD elements 8 to 10 and to produce just on the screen the display image from each of the respective LCD elements 8 to 10.

The polarization beam splitters 11 and 12 each include a glass substrate. Formed on one of the principal surfaces of the substrate is a light polarizing film including a dielectric multilayer film. On the other one thereof is formed an anti-reflection film including a multiple of layers of a dielectric material. FIGS. 5A and 5B respectively show reflection characteristics of the respective beam splitters 11 and 12. The beam splitter 11 allows a p-polarized light 13 of the red beam to pass therethrough and reflects an s-polarized light 14 thereof. The beam splitter 12 transmits therethrough a p-polarized light 15 and an s-polarized light of the blue beam as well as a p-polarized light 15 of the green beam and reflects an s-polarized light of the green beam.

Each of the phase plates 17 and 19 is manufactured by uniaxially extending a polycarbonate film to obtain a desired birefringence. The phase difference between the plates 17 and 19 and the optical axes thereof are adjusted such that when the light beam passes each of the phase plates 17 and 19 twice and is reflected by each of the beam reflection elements 18 and 20 twice, there arises a halfwave difference between the resultant light beam and the original beam. In this connection, each of the phase plate 17 and 19 is fixedly attached onto one of the principal surfaces of a glass substrate. Formed by evaporation on the other one thereof is an antireflection film including a dielectric multilayer film.

Each of the beam reflection elements 18 and 20 is mirror-finished by evaporating aluminum on a surface of a glass substrate. A reflection enhance layer is fabricated particulary on the surface thereof.

The display further includes, although not shown in FIG. 4, power sources for the light source 1 and signal processing circuit, means for cooling the LCD elements 8 to 10, a condenser lens to efficiently collect the light beams from the LCD elements 8 to 10 to the projection lens 7, and a housing of the display.

In the LCD projector configured as above, light emitted from the light source 1 is collected by the parabolic mirror 2 and is then separated through the dichroic mirror 3, beam splitter 12, and dichroic mirror 4 into red, green, and blue light beams. The light path of the red beam is bent by the beam splitter 11 and beam reflecting element 18 such that the resultant beam illuminates the red LCD element 8. The light paths respectively of the green and blue beams are bent respectively by the beam reflection element 20 and mirror 5 such that the obtained green and blue beam radiate the green and blue LCD elements 9 and 10, respectively. Images presented by the red, green, and blue LCD elements 8 to 10 are then compounded with each other and then the resultant image is enlarged and projected by the projection lens 7 onto a screen, not shown.

Referring now to FIGS. 4, 5A, and 5B, description will be given of the principle of the LCD projector of the embodiment configured as shown in FIG. 4. FIGS. 5A and 5B respectively show light reflection characteristics of the beam splitters adopted in the embodiment.

In the system of FIG. 4, the red beam reflected by the dichroic mirror 3 is separated through the beam splitter 11 into a p-polarized component and an s-polarized component orthogonal thereto. FIG. 5A is a graph showing the reflection characteristic of the beam splitter 11. As can be seen from this graph, the p-polarized light 13 of the red beam (with a wavelength ranging from 580 nanometers (nm) to 680 nm) passes the beam splitter 11, whereas the s-polarized light 14 is reflected by the splitter 11. The reflected s-polarized beam 14 is transmitted through the phase plate 17 and is reflected by the beam reflection element 18 twice. The reflected beam 14 passes again the phase plate 17 and then enters the beam splitter 11. Assume that the phase difference and direction of the optical axis of the phase plate 17 are adjusted such that when the beam passes the plate 17 twice and is reflected by the beam reflection element 18, there appears a halfwave phase difference between the resultant beam and the original beam. In this situation, the direction of polarization of the beam finally incident to the beam splitter 11 is rotated 90°, namely, there is obtained a p-polarized light 13. Consequently, the attained light 13 passes the beam splitter 11 and then illuminates the red LCD element 8.

On the other hand, the green and blue beams from the dichroic mirror 3 enter the beam splitter 12. FIG. 5B is a graph showing the reflection characteristic of the beam splitter 12. According to this graph, the p-polarized component 15 and s-polarized component 16 of the blue beam having a wavelength of 480 nm or less pass the beam splitter 12. The p-polarized component 15 of the green beam having a wavelength ranging from 480 nm to 580 nm passes the beam splitter 12, whereas the s-polarized component 16 thereof is reflected by the beam splitter 12. The p-polarized component of the green beam and the p-polarized and s-polarized components of the blue beam from the beam splitter 12 enter the dichroic mirror 4. Since the green beam passes the mirror 4, only the blue beam reflected by the dichroic mirror 4 is then reflected by the mirror 5 to resultantly illuminate the blue LCD element 10.

The s-polarized component of the green beam reflected by the beam splitter 12 passes the phase plate 19 to be reflected by the beam reflection element 20 twice. The obtained beam then passes again the phase plate 19 and enters the beam splitter 12. The phase difference and direction of the optical axis of the phase plate 19 are adjusted such that when the beam passes the plate 19 twice and is reflected by the beam reflection element 20, a halfwave phase difference takes place between the resultant beam and the original beam. Under this condition, the direction of polarization of the beam which finally enters the beam splitter 12 is rotated 90°. That is, there is attained a p-polarized light. Consequently, the obtained light passes the beam splitter 12 to illuminate the green LCD element 9.

In system dimensions, assuming a cube including as a diagonal thereof the dichroic mirror 3, the edge thereof is 80 mm long. This is also the case with a cube related to each of the dichroic mirror 4, mirror 5, and beam splitters 11 and 12. The cubes are separated 40 mm from each other. The distance between the parabolic mirror 2 to the dichroic mirror 3 is also 40 mm. In addition, a distance of 20 mm is provided between the beam splitter 11 and the red LCD element 8, between the beam splitter 12 and the green LCD element 9, and between the mirror 5 and the blue LCD element 10. The light path length from the light emitting surface of the parabolic mirror 2 to the blue LCD element 10 is 40×4+80×4+20=500 mm.

When the distance between the beam splitter 11 and the beam reflector 18 (a position where two mirrors are attached onto each other) and that between the beam splitter 12 and the beam reflector 20 (a mirror connecting position of two mirrors) are respectively adjusted to 80 mm, the optical path length from the parabolic mirror 2 to the red LCD element 8 and that from the mirror 2 to the green LCD element 9 are respectively obtained as 40×2+80×3+80×2+20=500 mm. This is equal to the light path length from the parabolic mirror 2 to the blue LCD element 10.

In the constitution described above, the number of reflections of beams by the optical constituent components disposed between the parabolic mirror 2 to the projection lens 7 is five, three, and three for the red, green, and blue beams, respectively. Namely, the numbers of reflections exclusively take odd values, which consequently prevents the inversion in the horizontal direction of the distribution of intensity of illumination described above. Therefore, even when diverging and converging components are present in the beam attained by collecting light from the light source 1 by the parabolic mirror 2, the relative distribution of intensity of illumination is equalized between the beams illuminating the LCD elements 8 to 10, respectively. In consequence, there is implemented an LCD projector capable of attaining a satisfactory white balance and homogeneous chromaticy and luminance in the projected screen image.

In this embodiment, when the mirror 5 is replaced with a polarization beam splitter for blue and the polarization axis of each of the polarizer and analyzer of the blue LCD element 10 is rotated 90°, only the s-polarized component of the blue beam enters the polarizer and hence the light absorbtion does not occur in the polarizer. This prevents deterioration of the polarizer due to heat caused by the light absorption. With the the polarization axes of the polarizer and analyzer of the blue LCD element 10 kept unchanged, the same advantageous effect is attainable when a halfwave plate is disposed immediately before the polarizer and the polarizing direction is rotated 90°. For the red and green LCD elements 8 and 9, the polarized components not effective in the beam projection have already been removed respectively by the beam splitter 11 and the beam splitter 12 and dichroic mirror 4, which leads to an advantageous effect of minimization of heat caused by the light absorption by the polarizer.

Figure 6:
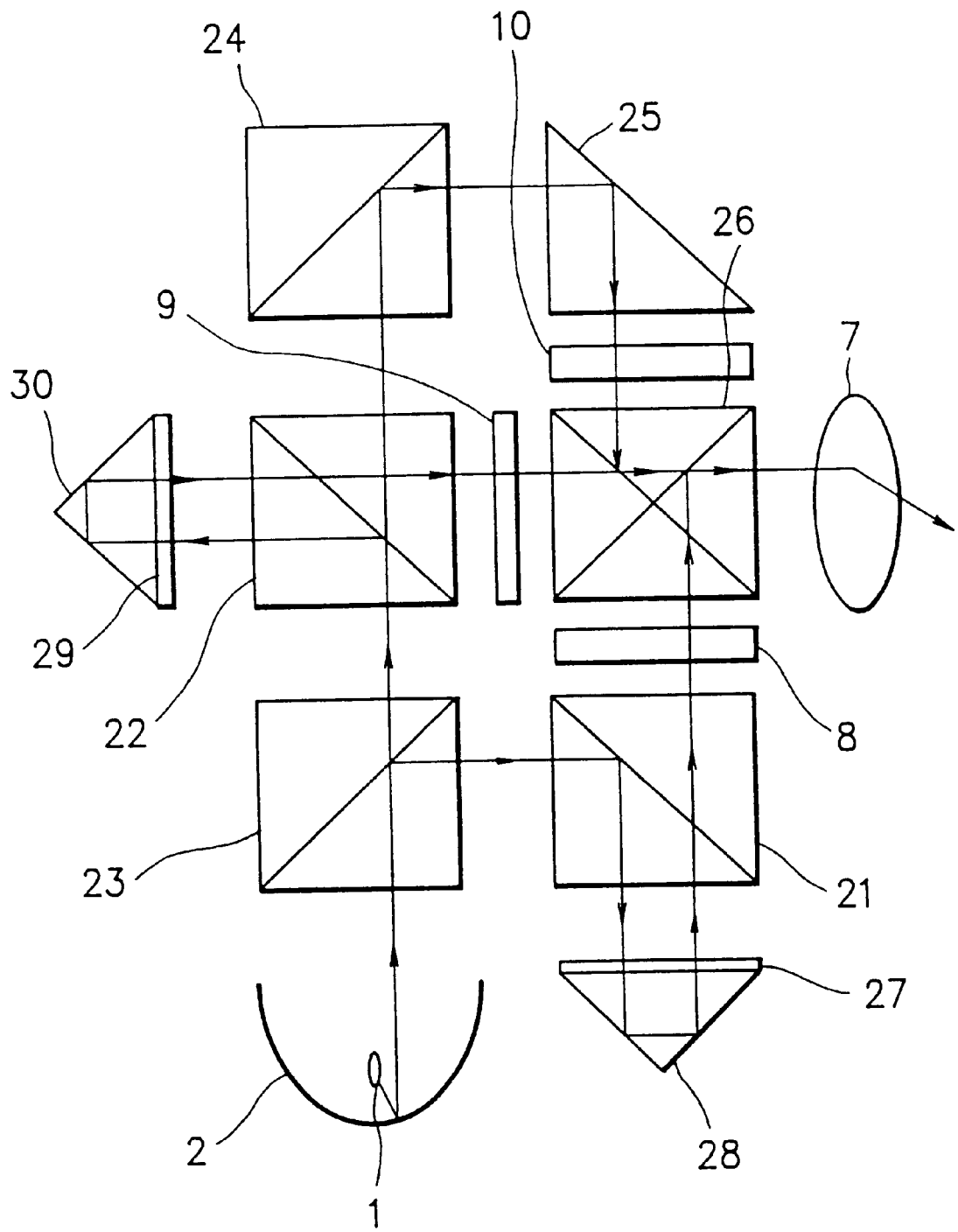
FIG. 6 is a plan view showing the configuration of a second embodiment of the LCD projector in accordance with the present invention.

FIG. 6 shows in a plan view the second embodiment of the LCD projector in accordance with the present invention. The configuration of FIG. 6 differs from that of FIG. 4 as follows. The plate-shaped optical constituent elements in the light path from the parabolic mirror 2 to the projection lens 7 of FIG. 4 such as the dichroic mirror 3, beam splitter 11, beam reflector 18, beam splitter 12, beam reflector 20, dichroic mirror 4, mirror 5, and cross dichroic mirror 6 are replaced with prism-shaped constituent components including a dichroic prism 23, a polarization beam splitter 21, a beam reflection element 28, a beam splitter 22, a beam reflector 30, a dichroic prism 24, a prism 25, and a cross dichroic prism 26.

Subsequently, description will be given of such characteristic components of the construction of FIG. 6 as the cross dichroic prism 26, dichroic prisms 23 and 24, polarized-light beam splitters 21 and 22, phase plates 27 and 29, beam reflection elements 28 and 30, and prism 25.

The prism 26 includes four rectangular prisms coupled with each other. On each of the coupling surfaces, there is fabricated a dichroic film by vapor deposition in advance. In the configuration, the dichroic film which reflects the red beam and which allows the blue and green beams to pass therethrough is orthogonal to the dichroic film which reflects the blue beam and which transmits the green and red beams therethrough. With this provision, light beams transmitted through the LCD elements 8 to 10 are combined with each other to be incident to the projection lens 7. On each of the light incident and emitting surfaces of the cross dichroic prism 26, there is formed an anti-reflection film including a dielectric multilayer film.

Each of the dichroic prisms 23 and 24 includes two prisms. A dichroic film including a dielectric multilayer film is evaporated on the slope of a first prism. The first prism is then attached onto the slope of a second prism. An antireflection film including a dielectric multilayer film is fabricated on each of the light incident and emitting planes of the dichroic prism 23. The dichroic prism film 23 has a characteristic to reflect the red beam and to allow the blue and green beams to pass therethrough, whereas the dichroic prism 24 reflect the blue beam and transmits the green beam therethrough.

The beam splitters 21 and 22 each include two prisms attached onto each other. A polarizing film including a dielectric multilayer film is evaporated on the slope of a first prism. The first prism is then attached onto the slope of a second prism, An anti-reflection film including a dielectric multilayer film is formed on each of the light incident and emitting planes of the prisms.

The beam splitters 21 and 22 have light reflection characteristics shown in FIGS. 5A and 5B, respectively. The splitter 21 propagates therethrough a p-polarized component 13 of the red beam and reflects an s-polarized beam 14 thereof. The splitter 22 passes therethrough a p-polarized component 15 and an s-polarized component 16 of the blue beam and a p-polarized component 15 of the green beam and reflects an s-polarized component 16 thereof.

Each of the beam reflectors 28 and 30 and prism 25 is a rectangular prism. The prism includes an anti-reflection film of a dielectric multilayer film particularly on each of the light incident and emitting planes thereof. The prisms of the optical elements are fabricated with a material called BK7.

The phase plates 27 and 29 are each manufactured by uniaxially extending a polycarbonate film to obtain a desired birefringence. The phase difference between the plates 27 and 29 and the optical axes thereof are adjusted such that when the light beam passes each of the phase plates 27 and 29 twice and is reflected by each of the beam reflection elements 28 and 30 twice, there arises a halfwave difference between the resultant light beam and the original beam. In this connection, the phase plates 27 and 29 are fixedly attached onto the beam reflectors 28 and 30, respectively.

The configuration of the LCD projector of the embodiment including the constituent elements described above is almost the same as that of the first embodiment shown in FIG. 4 and hence the lengths of the light paths between the light source 1 to the LCD elements 8 to 10 are equal to each other. Moreover, the number of reflections of each color beam due to the optical elements in the light path from the parabolic mirror 2 to the projection lens 7 exclusively takes an odd value and therefore prevents the inversion of the distribution of intensity of illumination in the horizontal direction. Consequently, there can be materialized an LCD projector in which an appropriate white balance and uniform chromaticy and luminance are obtained.

In the embodiment, since the light path is bent by the total reflection in each prism of the beam reflectors 28 and 30 and prism 25, the reflectivity is substantially 100%. Resultantly, when compared with the first embodiment, a higher brightness is obtained in the projection screen image in this embodiment thanks to the higher light utilization efficiency.

Furthermore, when the light path is made of glass, the length of light path for each color becomes shorter than the light path length obtained when the light path is made of air.

Consequently, even when the beam from the light source 1 includes a diverging component, the beam is efficiently transmitted to the LCD elements and the projected screen image has a satisfactory brightness. In addition, the back focus of the projection lens 7 can be reduced and hence it is possible to manufacture at a low cost a bright projection lens capable of producing a focused image with reduced distortion and aberration.

Figure 7:
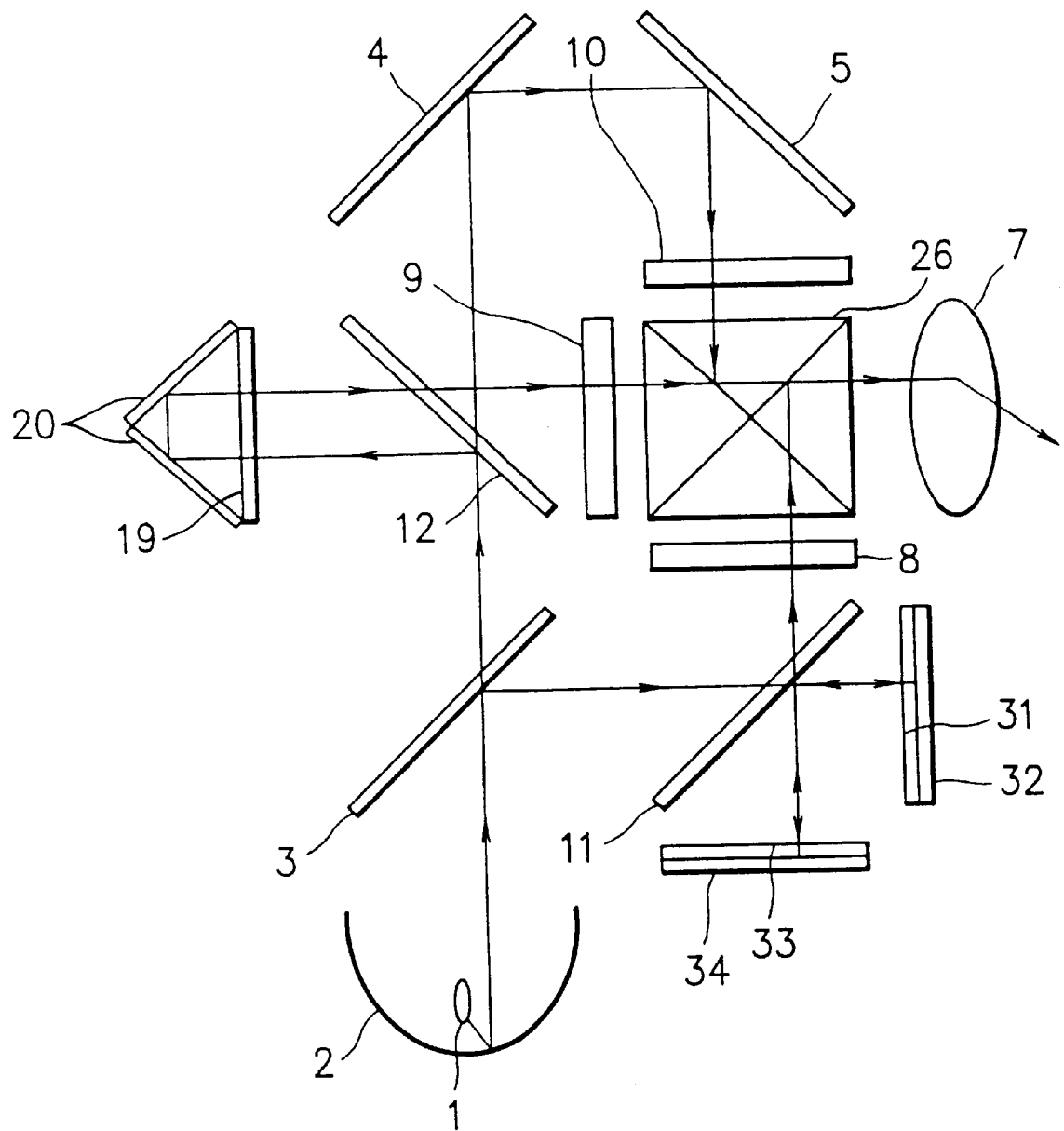
FIG. 7 is a plan view showing the configuration of a third embodiment of the LCD projector in accordance with the present invention.

FIG. 7 is a plan view showing the third embodiment of the LCD projector in accordance with the present invention. The configuration of FIG. 7 differs from that of the first embodiment of FIG. 4 as follows. The cross dichroic prism 26 of FIG. 6 is used in place of the cross dichroic mirror 6. Moreover, FIG. 7 is different from FIG. 4 in the arrangement of such components in the light path of red beam reflected by the dichroic mirror 3 as the beam splitter 11, phase plates 31 and 33, and beam reflectors 32 and 34.

The phase plates 31 and 33 are manufactured by uniaxially extending a polycarbonate film to obtain a desired birefringence so as to function as a quarter-wave plate. The optical axes respectively of the plates 31 and 33 are shifted 45° with respect to the s-polarized and p-polarized light beams obtained from the beam splitter 11. The phase plates 31 and 33 are fixed onto the beam reflection elements 32 and 34, respectively. Each element includes a glass substrate on which aluminum is coated by vapor deposition to form a mirror thereon. The beam splitter 11 is the same as that of the first embodiment of FIG. 4. Only the direction of the splitter 11 is turned 90° in FIG. 7.

In the construction of FIG. 7, a red beam reflected by the dichroic mirror 3 is separated by the beam splitter 11 into a p-polarized beam and an s-polarized beam orthogonal thereto. The obtained s-polarized beam enters the red LCD element 8 and is absorbed by the polarizer. Namely, the beam is ineffective for the image projection. The p-polarized beam from the element 8 passes the phase plate 31 to be reflected by the reflection element 32 and then again passes the phase plate 31 to enter the beam splitter 11. In this process, the p-polarized beam passes the quarter-wave phase plate 31 twice and hence the direction of polarization is rotated 90°. This means that the beam entering again the beam splitter 11 is an s-polarized beam. The beam is then reflected by the beam splitter 11 and passes the plate 33 to be reflected by the reflection element 34. The reflected beam passes again the plate 33 and is then transmitted to the beam splitter 11. In this optical operation, since the s-polarized beam passes the quarter-wave plate 33 two times, the direction of polarization thereof is rotated 90°. Namely, the beam entering again the beam splitter 11 is a p-polarized beam. In consequence, the beam passes the beam splitter 11 to be incident to the red LCD element 8.

When the distance from the beam splitter 11 to each of the reflectors 32 and 34 is set to 20 mm, the light path length from the parabolic mirror 2 to the red LCD element 8 is attained as 40×2+80×4+20×4+20=500 mm, which is equal to that of the light path from the mirror 2 to each of the green and blue LCD elements 9 and 10. The respective color beams are reflected by the optical constituent elements between the mirror 2 and the projection lens 7 five, three, and three times, respectively. Namely, the number of reflection is set exclusively to an odd value for each color and hence prevents the inversion of the distribution of illumination in the horizontal direction.

In consequence, the lengths of optical paths from the light source 1 respectively to the red, green, and blue LCD elements 8 to 10 can be adjusted to be identical to each other. Moreover, the numbers of reflections of the respective color beams are set only to odd values. Resultantly, there can be implemented an LCD projector in which the relative distribution of intensity of illumination is equalized for the light beams illuminating the LCD elements 8 to 10 and a satisfactory white balance and uniform chromaticy and luminance are attained. Additionally, when compared with the first embodiment of FIG. 4, the area utilized for the red beam path is reduced in this embodiment and therefore the display can be minimized in size.

Figure 8:
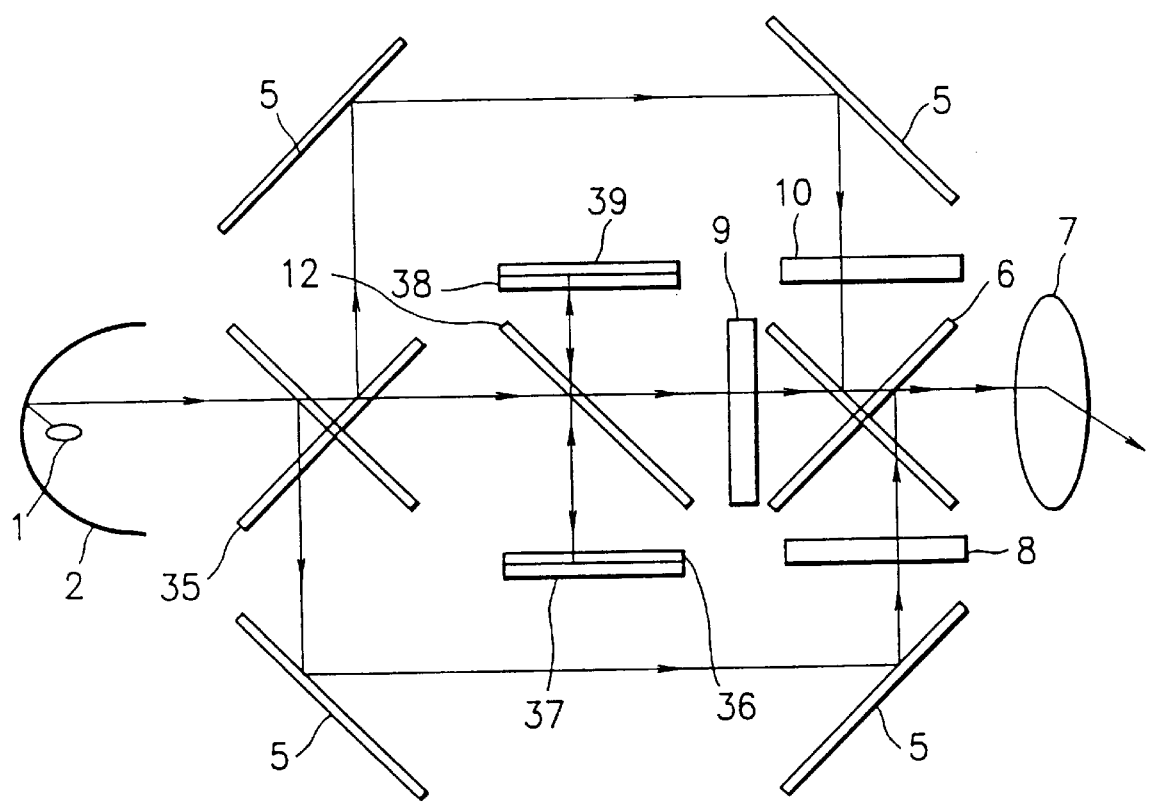
FIG. 8 is a plan view showing the configuration of a fourth embodiment of the LCD projector in accordance with the present invention.

FIG. 8 shows in a plan view the fourth embodiment of the projection LCD in accordance with the present invention. This display includes a light source 1, a parabolic mirror 2, cross dichroic mirrors 6 and 35, four mirrors 5, a projection lens 7, a red LCD element 8, a green LCD element 9, and a blue LCD element 10, a polarization beam splitter 12, phase plates 36 and 38, and light-beam reflection elements 37 and 39. In this embodiment, a white light radiated from the light source 1 is separated by the cross dichroic mirror 35 into red, green, and blue beams.

The mirror 35, which is the same as the cross dichroic mirror 6, has a characteristic to propagate the green beam therethrough and to reflect the red and blue beams.

However, to reflect the red and blue beams in a desired direction, the mirror 35 is rotated 90° relative to the mirror 6.

Each of the phase plates 36 and 38 is manufactured by uniaxially extending a polycarbonate film to obtain a desired birefringence so as to function as a quarter-wave plate. The optical axes thereof are turned 45° relative to the direction of polarization of an s-polarized light from the beam splitter 12. The phase plate 36 and 38 are fixedly attached onto the beam reflectors 37 and 39, respectively. The reflectors 37 and 39 each include a mirror formed by evaporating aluminum on a glass substrate. The other components are the same as those of the first embodiment of FIG. 4. However, the axes of polarization of the polarizer and analyzer attached to each of the LCD elements 8 to 10 are turned 90° such that the s-polarized beam passed through and reflected by the associated optical elements passes the polarizer to be incident to the projection lens 7.

The light emitted from the light source 1 is collected by the parabolic mirror 2 and is then separated by the dichroic mirror 35 into red, green, and blue beams. The light path of the blue beam transmitted through the mirror 35 is bent by the beam splitter 12 and beam reflection elements 37 and 39. The resultant beam illuminates the green LCD element 9. The light paths of red and blue beams reflected by the mirror 35 are bent by two mirrors 5 such that the red and blue beams illuminate the red and blue LCD elements 8 and 10, respectively. Images respectively presented on the red, green, and blue LCD elements 8 to 10 are combined with each other by the cross dichroic mirror 6. The obtained image is then enlarged and projected by the projection lens 7 onto a screen, not shown.

In FIG. 8, the green beam from the mirror 35 is separated by the beam splitter 12 into a p-polarized beam and an s-polarized beam orthogonal thereto. The p-polarized beam enters the green LCD element 9 to be absorbed by the polarizer and hence is not contributory to the image projection. The reflected s-polarized beam passes the phase plate 36 to be reflected by the reflection element 37 and then passes again the phase plate 36 to be incident to the beam splitter 12. In this process, since the s-polarized beam passes the quarter-wave phase plate 36 twice, the direction of polarization thereof is rotated 90°. Namely, the beam which enters again the beam splitter 12 is a p-polarized light. The p-polarized beam passes the beam splitter 11 and phase plate 38 to be reflected by the reflection element 39 and the passes again the phase plate 38 to be incident to the beam splitter 12. In the sequence of operations, the p-polarized beam passes the quarter-wave phase plate 38 two times, the direction of polarization thereof is turned 90° and hence the light entering again the beam splitter 12 is an s-polarized light. Consequently, the beam is reflected by the beam splitter 12 to illuminate the green LCD element 9.

In the display of the embodiment, the components are arranged as follows. Assuming a cube having the cross dichroic mirror 35 as its diagonal, the edge thereof is 80 mm long. Forming a square with each of the mirror and beam splitter 12 as its diagonal, the edge thereof is also 80 mm long. The distance between the cross dichroic mirror 35 to each of the parabolic mirror 2, adjacent mirror 5, an beam splitter 12 is 40 mm. The distances respectively between the red LCD element 8 and the adjacent mirror 5, between the blue LCD element 10 and the adjacent mirror 5, and between the beam splitter 12 and the green LCD element 9 are each 20 mm. The distance between two mirrors disposed in each of the light paths respectively of red and blue beams is 160 mm. The light path length from the light emitting plane of the parabolic mirror 2 to each of the red and blue LCD elements 8 and 10 is 40×2+80×3+160+20=500 mm. Setting the distance from the beam splitter 12 to each of the reflectors 37 and 39 to 20 mm, the light path length from the parabolic mirror 2 to the green LCD element 9 becomes 40×2+80×4+20×4+20=500 mm. This is equal to the light path length for the red and blue LCD elements 8 and 10.

Each of he respective beams are reflected four times by the optical elements between the parabolic mirror 2 and the projection lens 7. The numbers of reflections of the respective color beams are set to an even value, which prevents the inversion of the distribution of intensity of illumination in the horizontal direction.

In consequence, there can be formed an identical length for the light paths from the light source 1 to the red, green, and blue LCD elements 8 to 10, respectively. Since the numbers of reflections of the respective color beams are set to an even value, there can be materialized an LCD projector in which the relative distribution of intensity of illumination is equalized for the light beams illuminating the respective LCD elements 8 to 10 and there are attained a favorable white balance and uniform chromaticy and luminance in the projected screen image.

Figure 9:
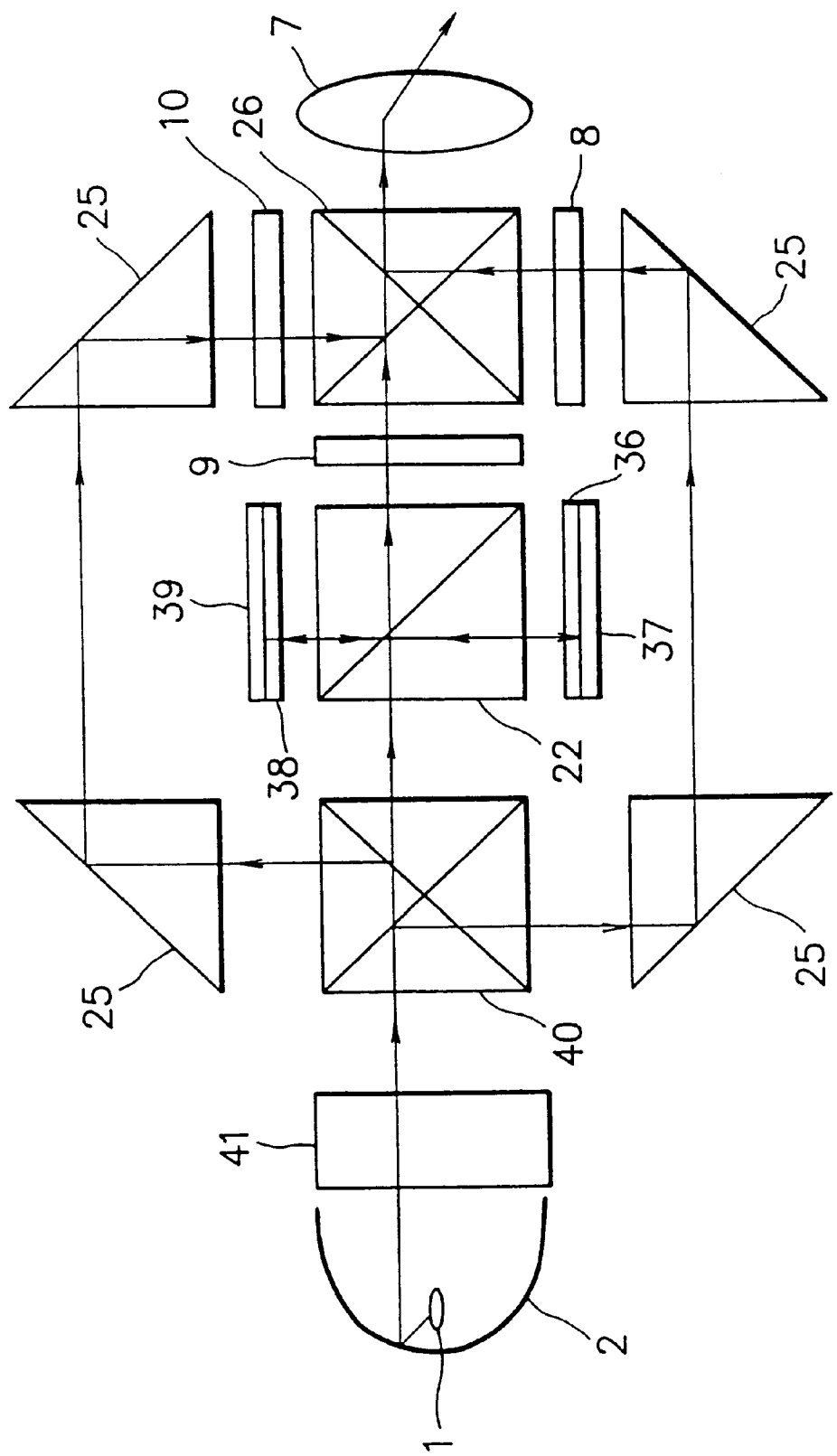
FIG. 9 is a plan view showing the configuration of a fifth embodiment of the LCD projector in accordance with the present invention.

FIG. 9 is a plan view showing the fifth embodiment of the LCD projector in accordance with the present invention. In FIG. 9, when compared with the fourth embodiment of FIG. 8, the plate-shaped optical elements including the cross dichroic mirrors 6 and 35, beam splitter 12, and mirror 5 are replaced, like in the second embodiment of FIG. 6, with such prism-shaped optical components as cross dichroic prisms 26 and 40, a beam splitter 22, and a prism 25. Moreover, an optical integrator 41 is provided in a light path from the parabolic mirror 2 to the cross dichroic prism 40.

The configuration of the display of this embodiment is substantially the same as that of the fourth embodiment shown in FIG. 8 in which the optical path lengths from the light source 1 to the respective LCD elements 8 to 10 are almost identical to each other. When compared with the fourth embodiment of FIG. 8, the light path is bent by the total reflection in the prism 29 in this embodiment. This results in substantially a reflectivity of 100% and hence a high light utilization efficiency is attained. As compared with the length of the light path when the medium of the light path is air, the length of light path is shorter for each color when the path is made of glass. Therefore, even when the light beam from the light source 1 includes a converging component, the light beam efficiently enters the LCD elements 8 to 10 and the projected screen image has resultantly high brightness. Moreover, the back focus of the projection lens 7 becomes shorter and hence there can be manufactured at a low cost a bright projection lens capable of producing a screen image with reduced distortion and aberration.

Figure 10:
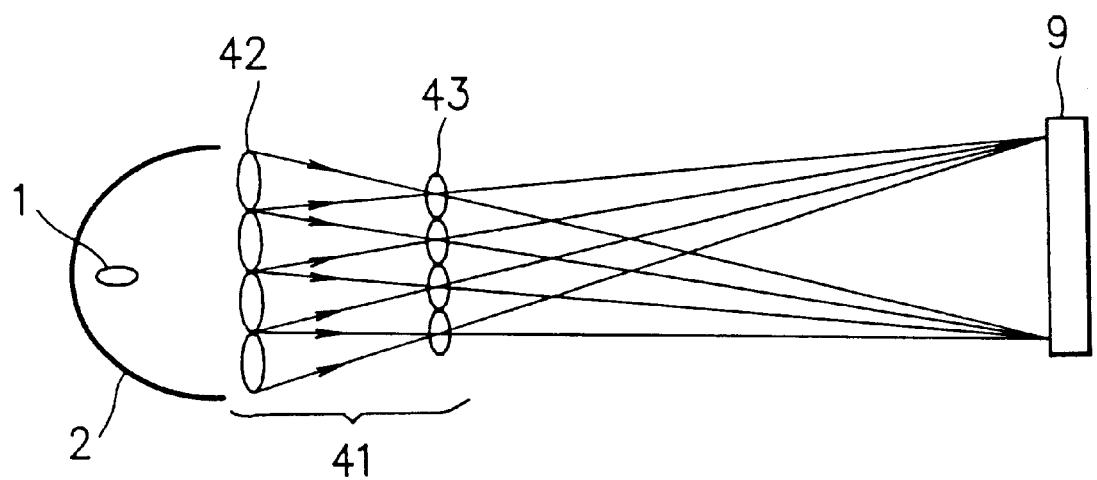
FIG. 10 is a plan view partly showing the configuration of an optical integrator employed in the fifth embodiment.

FIG. 10 is a partial plan view showing only the construction of the optical integrator 41. For easy understanding of the structure, this diagram includes only the constituent elements necessary for description of the integrator 41. Optical integrators have been described, for example, in "New Plusfactors in an LCD-Projector" in pages 151 to 154 of the "Conference Record of the 1991 International Display Research Conference". The optical integrator 41 includes a first lens array 42 and a second lens array 43. The first lens array 42 includes lenses to focus light beams onto associated lenses of the second lens array 43. Each lens of the first array 42 has a focal length equal to the distance between the first and second arrays 42 and 43. The lenses of the second array 43 produce focused images of openings of the associated lenses of the first array 42 onto the green LCD element 9 in an overlapping fashion.

Using the integrator 41, there is obtained a beam having a homogeneous distribution of intensity of illumination. The attained beam illuminates the green LCD element 9. Moreover, even the light beam from the light source includes a diverging component, the light can be efficiently collected to obtain a satisfactory projection image with a uniform brightness. However, when the integrator 41 is applied to the conventional examples of FIGS. 1 and 2, since the distances from the integrator 41 to the respective LCD elements 8 to 10 are different from each other, the optical relationship to produce a focused image is changed and hence the light gathering efficiency and homogeneity of illumination are deteriorated and a color shading takes place. On the other hand, the distances from the light source 1 to the respective LCD elements 8 to 10 are equal to each other in this embodiment and the distances from the integrator 41 to the respective LCD elements 8 to 10 are equal to each other. Consequently, the advantage of the optical integrator 41 can be effectively utilized. That is, the beams respectively illuminating the LCD elements 8 to 10 are equal in the relative distribution of intensity of illumination, and the beams homogeneously illuminate the elements 8 to 10 with a favorable efficiency. Consequently, there can be implemented an LCD projector capable of projecting on a screen a bright screen image with a satisfactory white balance and uniform chromaticy and luminance.

Figure 11:
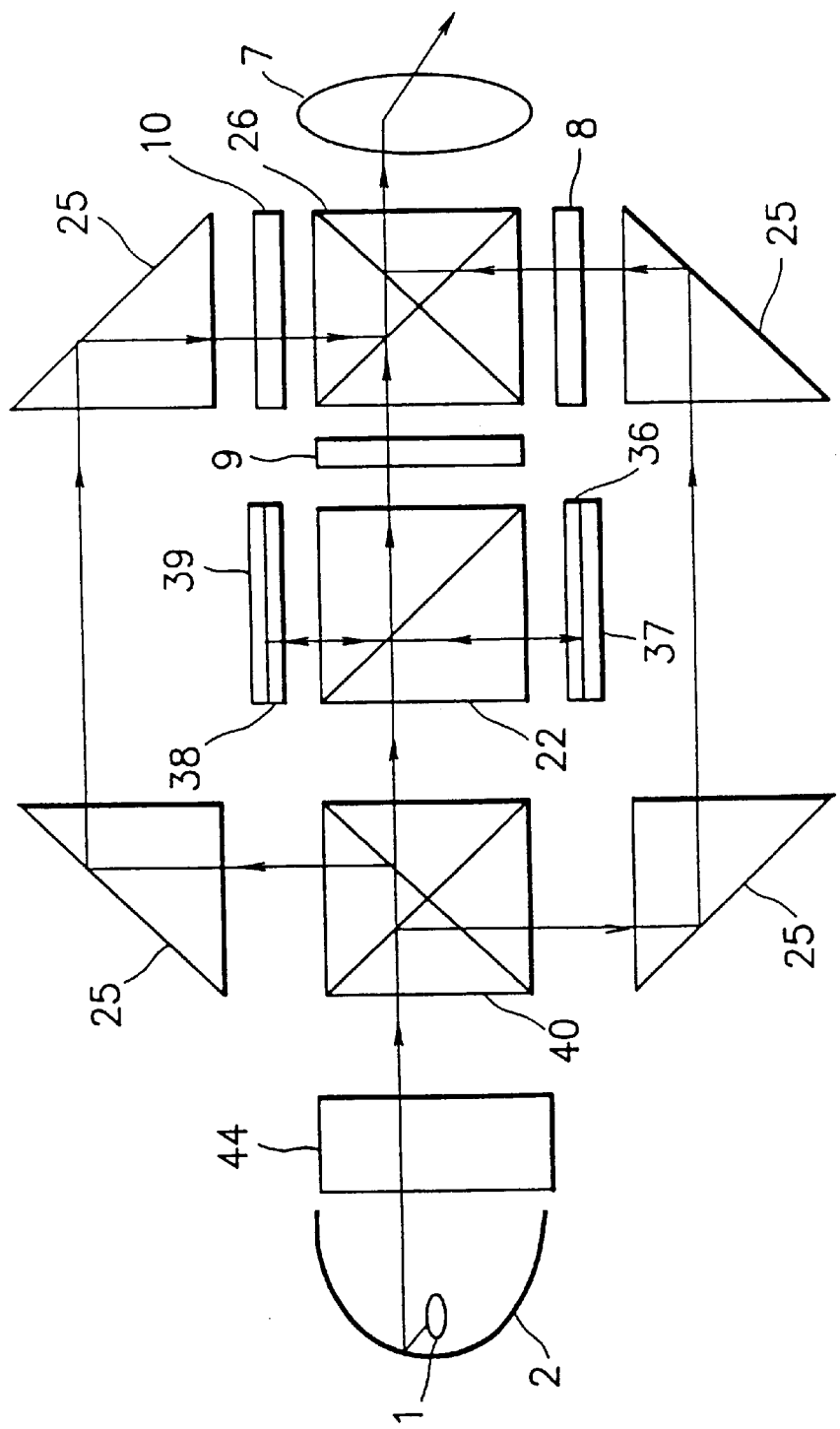
FIG. 11 is a plan view showing the configuration of a sixth embodiment of the LCD projector in accordance with the present invention.

FIG. 11 is a plan view showing the sixth embodiment of the LCD projector in accordance with the present invention. When comparing with the fifth embodiment of FIG. 9, the display of the sixth embodiment includes a polarized converting optical system or polarizing system 44 in place of the optical integrator 41.

Figure 12:
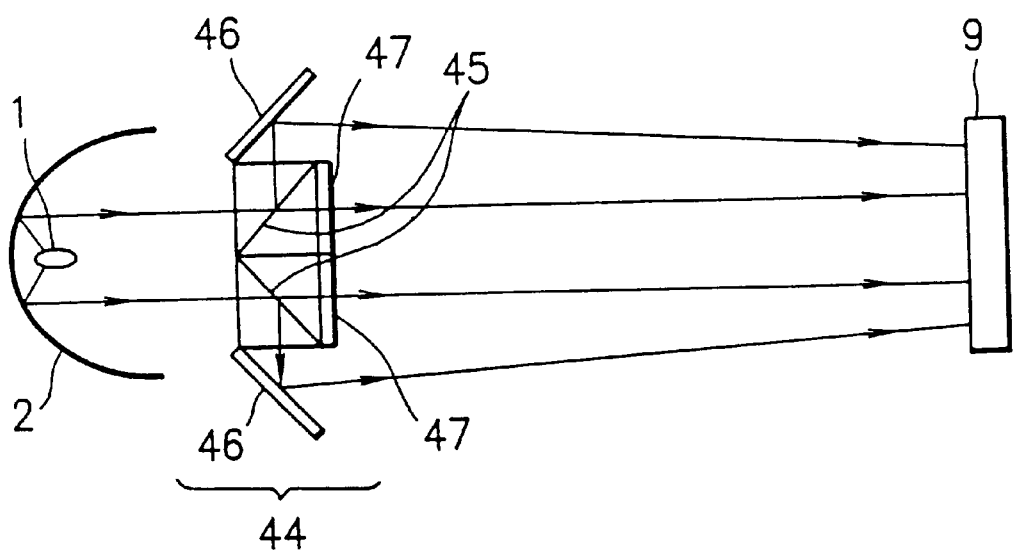
FIG. 12 is a partial plan view showing in detail a polarizing system of FIG. 11.

FIG. 12 shows in a partial plan view the configuration of the polarizing system 44. For simplification of the configuration, the diagram of FIG. 12 includes only the constituent elements necessary for description. The system 44 is the same in configuration as that described in the Japanese Patent Application No. 4-33821 entitled "LCD Projector" and includes two beam splitters 45, two beam reflection elements 46, and two halfwave plates 47.

Description will be specifically given of the beam splitters 45, beam reflectors 46, and halfwave plates 47 of the polarizing system 44.

The splitter 45 includes two rectangular prisms. A quasi-transparent film which includes a dielectric multilayer film and which serves as a polarized-light separation plane is evaporated on the slope of each of the rectangular prisms and then the evaporated slopes are fixedly attached onto each other. The splitter 45 has a function to separate particularly natural light having a wavelength in the visible light range into two linearly polarized lights orthogonal to each other in which p-polarized and s-polarized lights are orthogonal to each other in the direction of polarization. On each of the light incident and emission surfaces of the splitter 45, there is formed an anti-reflection layer including a dielectric multilayer film.

The beam reflector 46 includes a glass substrate on which aluminum is evaporated. Formed on the aluminum layer is an enhanced reflection film including a dielectric multilayer film.

The halfwave plate 47 includes a glass plate. A polycarbonate film uniaxially extended to obtain a desired birefringence is fixedly attached onto one of the principal surfaces of the glass plate. Particularly, two polycarbonate films are fixed onto each other with the optical axes respectively thereof shifted from each other so that the wavelength deviation is compensated for and the direction of polarization of the linearly polarized light having the visible light wavelength can be efficiently rotated 90°. An anti-reflection layer including a dielectric multilayer film is evaporated on the remaining principal surface of the glass substrate.

The polarizing system 44 functions as follows. The light obtained by collecting through the parabolic mirror 2 natural light emitted from the light source 1 is separated by the beam splitter 46 into two linearly polarized light beams of which the directions of polarization are orthogonal to each other. An s-polarized beam reflected by the splitter 46 is reflected by the reflection element 46 to illuminate the green LCD element 9. On the other hand, a p-polarized beam transmitted through the splitter 45 is incident to the halfwave plate 47. The direction of polarization of the p-polarized beam is rotated 90° and thereafter the resultant beam illuminates the green LCD element 9. Consequently, the natural light emitted from the light source 1 is completely transformed into a linearly polarized light having a fixed direction of polarization. This prevents generation of any polarized components which are absorbed by the polarizer of the green LCD element and which are not contributory to the image projection. As a result, the light utilization efficiency is advantageously doubled.

Figure 1:
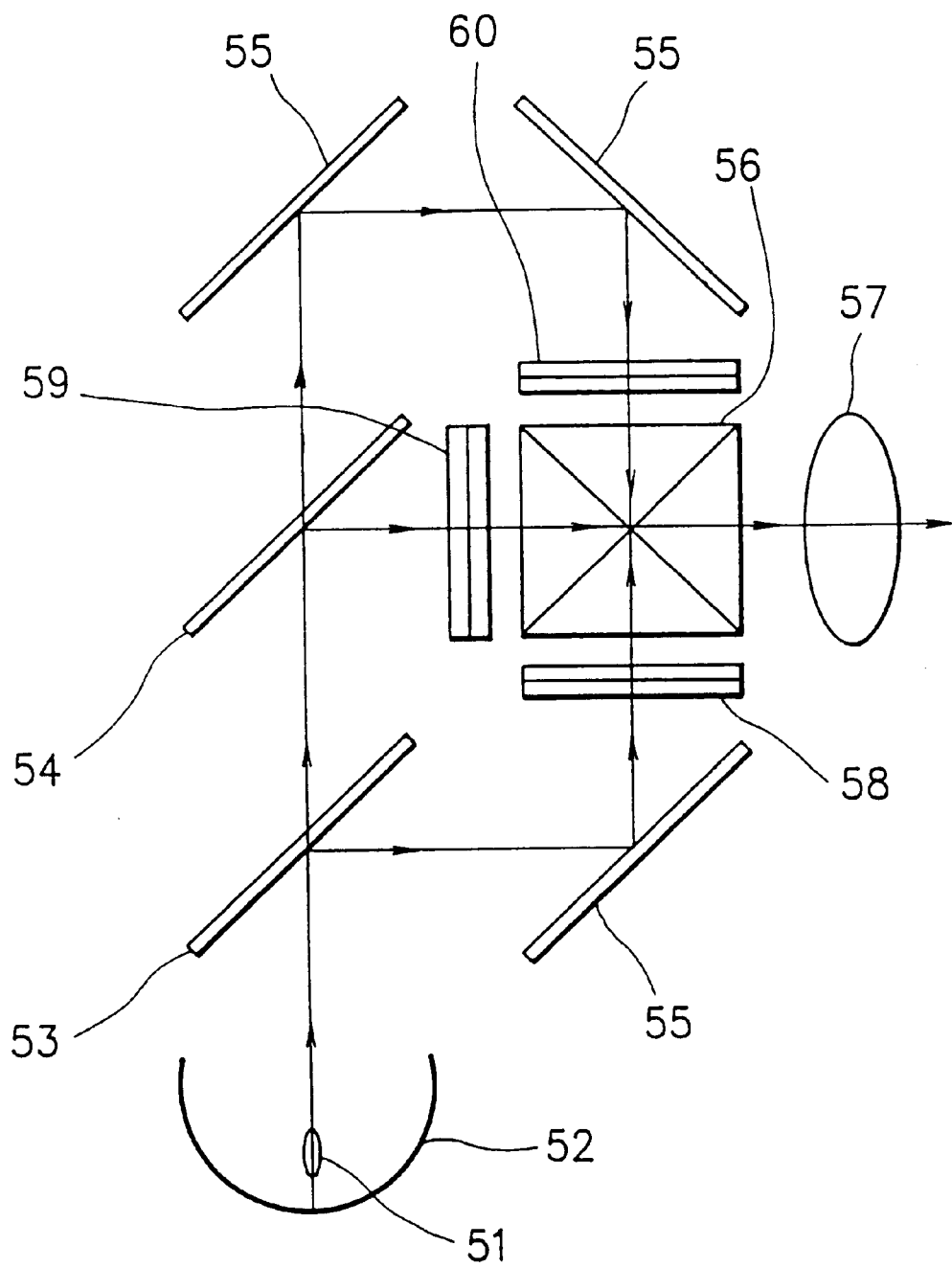
FIG. 1 is a plan view showing a conventional example of the LCD projector.
Figure 2:
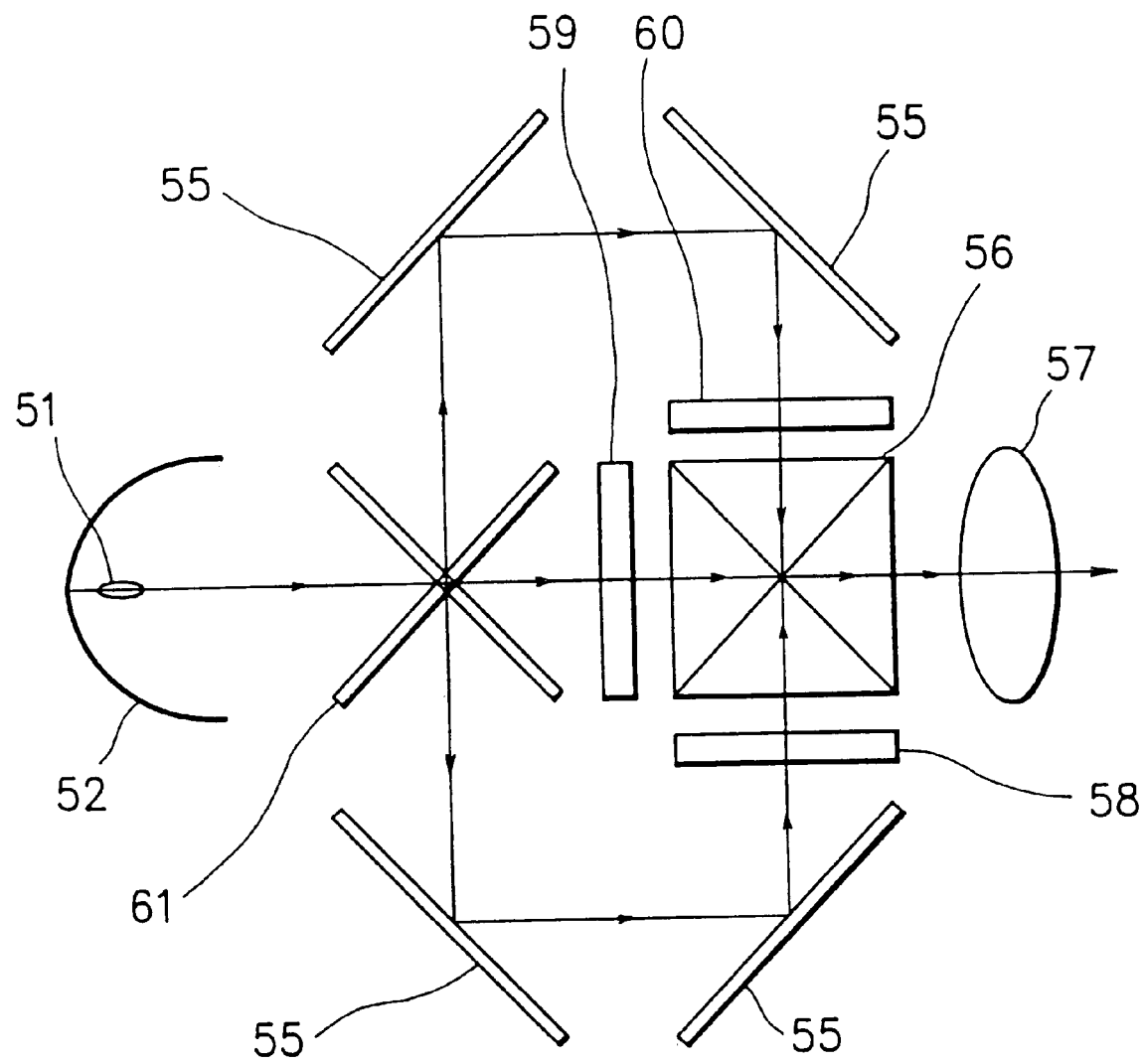
FIG. 2 is a plan view showing another conventional example of the LCD projector; is a signal
Figure 3:
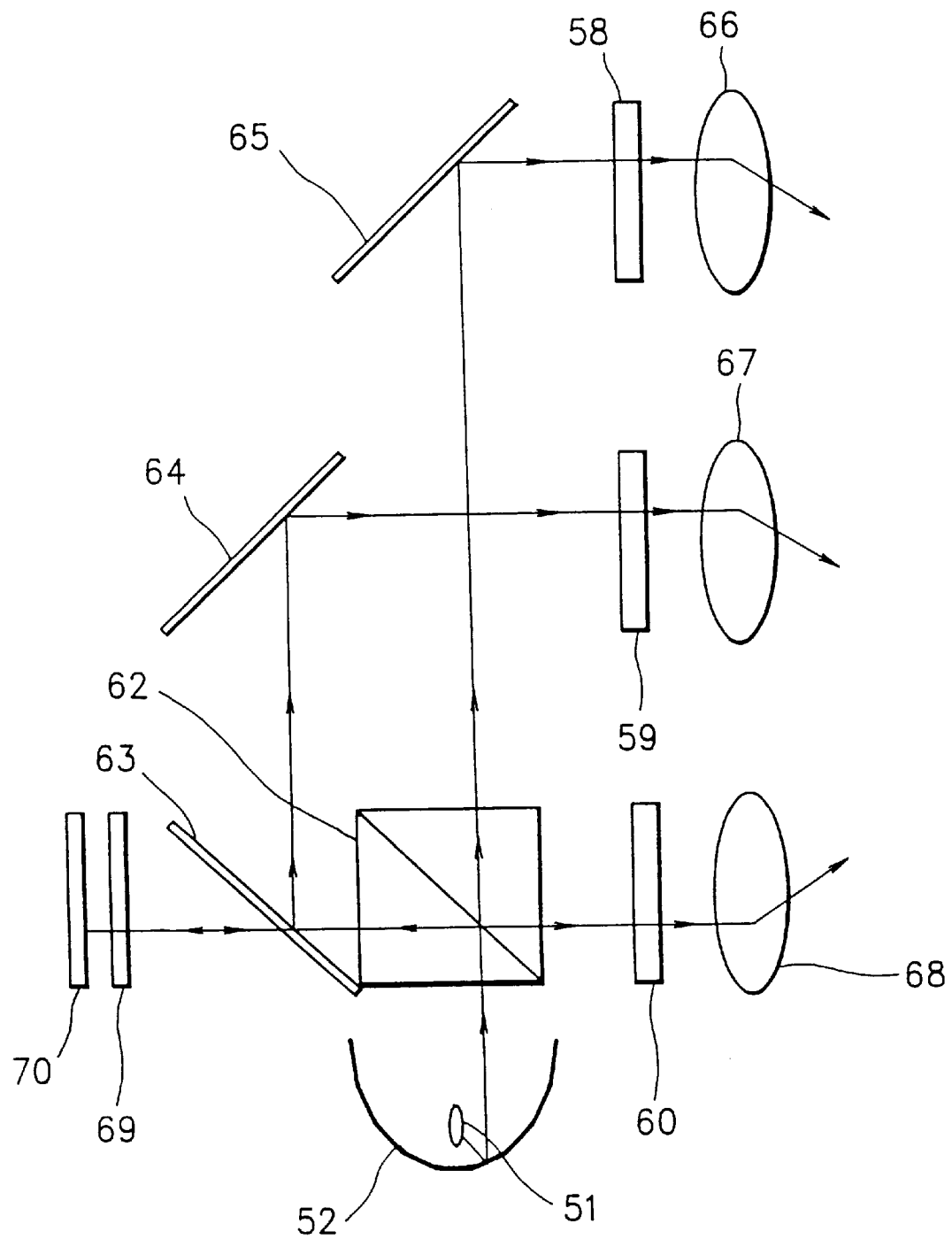
FIG. 3 is a plan view showing still another conventional example of the LCD projector.

However, when the polarizing system 44 is applied to the conventional examples of FIGS. 1 and 2, since the distances from the system 44 to the LCD elements 8 to 10 of the respective colors are different from each other, the homogeneity in luminance and chrominance is lost. Particularly, since the light beams reflected by the beam reflection element 46 are slightly inclined from the direction orthogonal to the respective LCD elements 8 to 10, when the distances above are different from each other, the illuminating positions of the respective beams are also shifted from each other, leading to a problem in which the color shading is further emphasized.

On the other hand, in accordance with the embodiment, since the distances from the system 44 to the LCD elements 8 to 10 are substantially equal to each other, the advantageous effect of the polarizing system can be satisfactorily developed. In other words, the same relative distribution of intensity of illumination is attained for the beams illuminating the respective LCD elements 8 to 10 and the beams are radiated thereto without any loss of polarized components as above. Consequently, there can be materialized an LCD projector capable of projecting on a screen a bright screen image with a desired white balance and homogeneous chromaticy and luminance. In addition, when the optical integrator 41 adopted in the fifth embodiment of FIG. 9 is provided after the polarizing system 44, the uniformity of luminance is remarkably improved and hence the LCD projector can produce a projected screen image with an increased brightness.

Description has been given of suitable embodiments of the present invention only by way of example. However, the embodiments do not restrict the present invention. Namely, various modifications and changes are possible within the scope of the present invention. For example, in the first to sixth embodiments, as the light source 1, there may be employed, in addition to the metal halide lamp, such light sources which emit high-luminance white light as a xenon lamp and a halogen lamp. The means for collecting light from the light source 1 is not restricted by the parabolic mirror, namely, there may be adopted a spherical mirror, a combination of an elliptic mirror and a condenser lens, and a non-spherical mirror. The liquid crystal is not limited to the twist-nematic liquid crystal.

What is claimed is:

1. A liquid-crystal display projector capable of displaying a color image, comprising:
   a light source;
   a color separation optical system for separating a light from the light source into red, green, and blue color beams;
   a first, a second, and a third liquid-crystal display elements arranged to transmit the red, green, and blue color beams, respectively;
   a color mixing optical system for mixing the color beams, transmitted through the liquid-crystal display elements, into one beam;

a projection lens; and optical path length adjusting means disposed in at least one of the optical paths from the light source to one of the liquid-crystal display elements, the optical path length adjusting means including a polarization beam splitter, a phase plate, and a beam reflection element;

the optical path length adjusting means being arranged and constructed such that numbers of reflections of each of the color beams reflected in the respective optical paths from the light source to the projection lens are set only to odd numbers; wherein:

in the optical path length adjusting means, the phase plate and the beam reflection element including two reflection surfaces orthogonal to each other are sequentially arranged in a direction in which one of the color beams reflected by the beam splitter propagates; and the reflection element is arranged such that said one of the color beams reflected by the reflection element passes the phase plate and the beam splitter to illuminate the liquid-crystal display element associated with said one of the color beams.

2. The liquid-crystal display projector in accordance with claim 1, wherein the color mixing optical system includes a cross dichroic mirror.

3. The liquid-crystal display projector in accordance with claim 1, wherein the color mixing optical system includes a cross dichroic prism.

4. A liquid-crystal display projector capable of displaying a color image, comprising:

a light source;

a color separation optical system for separating a light from the light source into red, green, and blue color beams;

a first, a second, and a third liquid-crystal display elements arranged to transmit the red, green, and blue color beams, respectively;

a color mixing optical system for mixing the color beams, transmitted through the liquid-crystal display elements, into one beam;

a projection lens; and optical path length adjusting means disposed in at least one of the optical paths from the light source to one of the liquid-crystal display elements, the optical path length adjusting means including a polarization beam splitter, a phase plate, and a beam reflection element;

the optical path length adjusting means are arranged and constructed such that numbers of reflections of each or the color beams reflected in the respective optical paths from the light source to the projection lens are set only to even numbers; wherein:

in the optical path length adjusting means, the phase plate and the beam reflection element including two reflection surfaces orthogonal to each other are sequentially arranged in a direction in which one of the color beams reflected by the beam splitter propagates; and the reflection element is arranged such that said one of the color beams reflected by the reflection element passes the phase plate and the beam splitter to illuminate the liquid-crystal display element associated with said one of the color beams.

5. The liquid-crystal display projector in accordance with claim 4, wherein the color mixing optical system includes a cross dichroic mirror.

6. The liquid-crystal display projector in accordance with claim 4, wherein the color mixing optical system includes a cross dichroic prism.

7. A liquid-crystal display projector capable of displaying a color image, comprising:

a light source;

a color separation optical system for separating a light from the light source into red, green, and blue color beams;

a first, a second, and a third liquid-crystal display elements arranged to transmit the red, green, and blue color beams, respectively;

a color mixing optical system for mixing the color beams, transmitted through the liquid-crystal display elements, into one beam;

a projection lens; and optical path length adjusting means disposed in at least one of the optical paths from the light source to one of the liquid-crystal display elements, the optical path length adjusting means including a polarization beam splitter, a phase plate, and a beam reflection element;

the optical path length adjusting means being arranged and constructed such that numbers of reflections of each of the color beams reflected in the respective optical paths from the light source to the projection lens are set only to odd numbers or only to even numbers;

wherein the color mixing optical system includes a cross dichroic mirror.

8. The liquid-crystal display projector in accordance with claim 7, wherein:

the optical path length adjusting means includes a first phase plate and a first polarized-light beam reflection element sequentially arranged in a direction in which one of the color beams reflected by the beam splitter propagates, the first reflection element arranged such that said one of the color beams reflected by the first reflection element passes the first phase plate and the beam splitter; and the optical path length adjusting means includes a second phase plate and a second polarized-light beam reflection element sequentially arranged in a direction in which said one of the color beams passes the beam splitter, the second reflection element being arranged such that said one of the color beams reflected by the second reflection element passes the second phase plate and is then reflected by the beam splitter to illuminate the liquid-crystal display element associated with said one of the color beams.

9. A liquid-crystal display projector capable of displaying a color image, comprising:

a light source;

a color separation optical system for separating a light from the light source into red, green, and blue color beams;

a first, a second, and a third liquid-crystal display elements arranged to transmit the red, green, and blue color beams, respectively;

a color mixing optical system for mixing the color beams, transmitted through the liquid-crystal display elements, into one beam;

a projection lens; and optical path length adjusting means disposed in at least one of the optical paths from the light source to one of the liquid-crystal display elements, the optical path length adjusting means including a polarization beam splitter, a phase plate, and a beam reflection element;

the optical path length adjusting means being arranged and constructed such that numbers of reflections of each of the color beams reflected in the respective optical paths from the light source to the projection lens are set only to odd numbers;

wherein the color mixing optical system includes a cross dichroic prism.

10. The liquid-crystal display projector in accordance with claim 9, wherein:

the optical path length adjusting means includes a first phase plate and a first polarized-light beam reflection element sequentially arranged in a direction in which one of the color beams reflected by the beam splitter propagates, the first reflection element arranged such that said one of the color beams reflected by the first reflection element passes the first phase plate and the beam splitter; and the optical path length adjusting means includes a second phase plate and a second polarized-light beam reflection element sequentially arranged in a direction in which said one of the color beams passes the beam splitter, the second reflection element being arranged such that said one of the color beams reflected by the second reflection element passes the second phase plate and is then reflected by the beam splitter to illuminate the liquid-crystal display element associated with said one of the color beams.

* * * * *